(Model.)
F. E. OLTZ.
Lip and Bail Attachment for Jugs.
No. 235,284. Patented Dec. 7, 1880.
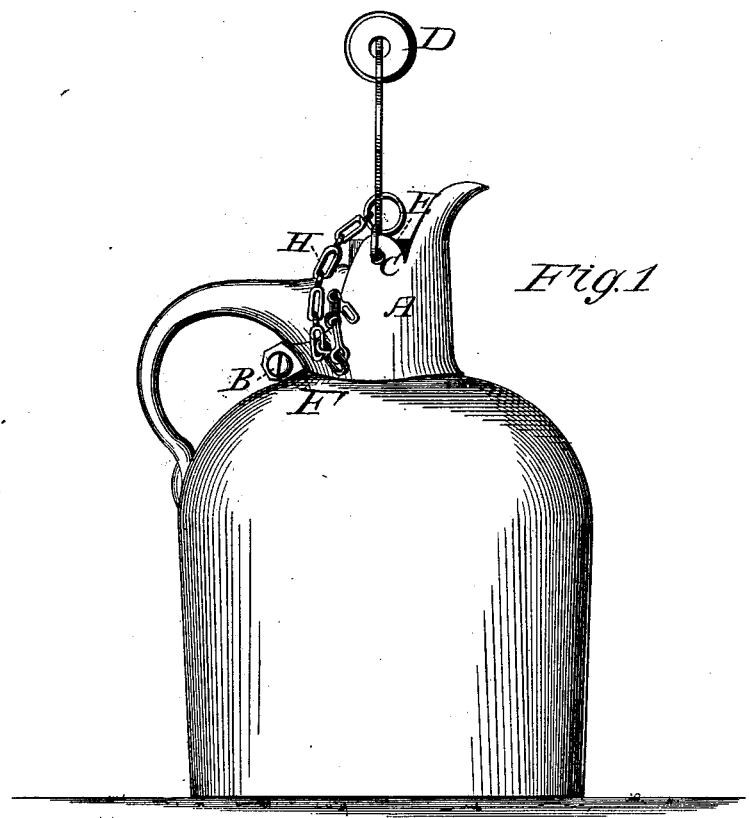
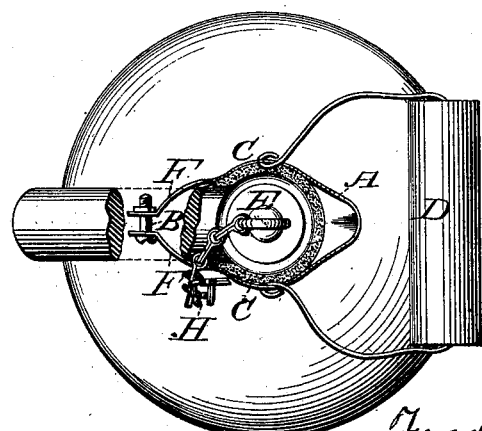
Witnesses:
Inventor:

UNITED STATES PATENT OFFICE.

FREDERICK E. OLTZ, OF LINCOLN, ASSIGNOR OF ONE-HALF TO CHARLES H. ROBINSON, OF LOGAN COUNTY, ILLINOIS.

LIP AND BAIL ATTACHMENT FOR JUGS.

SPECIFICATION forming part of Letters Patent No. 235,284, dated December 7, 1880.

Application filed September 21, 1880. (Model.)

*To all whom it may concern:*

Be it known that I, FREDERICK E. OLTZ, of the city of Lincoln, in the county of Logan and State of Illinois, have invented a new and useful Lip and Bail Attachment for Jugs, and which may be attached to and used also upon cans or any other vessels suitable for the purpose, of which the following is a specification, reference being had to accompanying drawings.

My invention is intended to furnish in the lip a better method of emptying a vessel (particularly a jug) of its contents, and the bail attachment an easier and more convenient method of transporting the vessel from one place to another by hand than is afforded by inserting the hand or fingers in the handle of a jug, or any similar handle.

In the drawings, Figure 1 represents a jug, and Fig. 2 is a top view with the handle broken away.

Letter A represents a lip attachment, composed of any suitable material, placed around the mouth of the vessel, the rear portions of the lip attachment on each side being narrowed to the form of strips F to serve as clamps, the points of the strip-clamps nearly meeting within the handle of the jug. Through the end of each clamp is a hole, and through both said holes is inserted a bolt, B, one end having a head, and upon the other is a screw-tap, the object of which is to draw the ends of the clamps toward each other and thus draw the lip attachment tightly around the neck of the vessel.

Between the lip attachment A and neck of the vessel I have a filling of cement, or any material that will completely fill that space and prevent any liquid running down between the lip and neck of the vessel.

On each side of the lip attachment, and upon a line that would be directly over the center of the vessel, is an ear, C, each perforated to receive the bail attachment hereinafter described. Said ears may be solid with the lip, or constructed separately, and riveted to the lip, the former being preferred.

The bail attachment D, constructed in the usual form of such attachments, should have sufficient expansion at the top for the insertion of the hand. The lower end of each arm shall be curved and attached to ears C by being looped or inserted in the perforations in said ears and firmly secured, but so as to work loosely therein as a loose-joint attachment to said ears.

Letter E represents a cork attachment, by which a cork used for closing the mouth of the vessel is, by a ring or any suitable attachment thereto, secured to one end of a chain or cord, H, the outer end being attached to the side of the lip attachment by being soldered or riveted thereto.

Having described my invention, what I claim, and desire to secure by Letters Patent, is—

1. The combination, with a vessel, of lip attachment A, provided with ears C, and bail D, attached to said ears, and means for securing the lip attachment A to the neck of the vessel, as and for the purposes above set forth.

2. The combination, with a vessel, of lip attachment A, having clamp-strip F, screw-bolt B and its nut, ears C, bail D, and provided with cement between the lip attachment A and the neck of the vessel, as and for the purposes set forth.

FREDERICK E. OLTZ.

Witnesses:
GEO. D. CORWINE,
FRANK C. HOUSER.